(12) United States Patent
Fang

(10) Patent No.: US 11,830,196 B2
(45) Date of Patent: Nov. 28, 2023

(54) METHOD FOR VERIFYING A SEGMENTATION RESULT OF A 3D DIGITAL MODEL OF JAW

(71) Applicant: NINGBO SHENLAI MEDICAL TECHNOLOGY CO., LTD., Ningbo (CN)

(72) Inventor: Ke Fang, Ningbo (CN)

(73) Assignee: NINGBO SHENLAI MEDICAL TECHNOLOGY CO., LTD., Ningbo (CN)

( * ) Notice: Subject to any disclaimer, the term of this patent is extended or adjusted under 35 U.S.C. 154(b) by 173 days.

(21) Appl. No.: 17/614,542

(22) PCT Filed: Jan. 22, 2021

(86) PCT No.: PCT/CN2021/073235
§ 371 (c)(1),
(2) Date: Nov. 28, 2021

(87) PCT Pub. No.: WO2021/212941
PCT Pub. Date: Oct. 28, 2021

(65) Prior Publication Data
US 2022/0222827 A1 Jul. 14, 2022

(30) Foreign Application Priority Data
Apr. 21, 2020 (CN) .......................... 202010317368.6

(51) Int. Cl.
*G06T 7/11* (2017.01)
*G06T 19/20* (2011.01)
(Continued)

(52) U.S. Cl.
CPC ................ *G06T 7/11* (2017.01); *G06T 19/20* (2013.01); *G06V 10/454* (2022.01);
(Continued)

(58) Field of Classification Search
CPC ....... G06T 7/10–12; G06T 7/70; G06T 19/20; G06T 2207/10028; G06T 2207/20081;
(Continued)

(56) References Cited

U.S. PATENT DOCUMENTS

| 8,021,147 B2 * | 9/2011 | Sporbert ............... A61C 9/0046 433/24 |
| 8,126,726 B2 * | 2/2012 | Matov .................... A61C 7/002 702/155 |

(Continued)

FOREIGN PATENT DOCUMENTS

| CN | 104867131 A | 8/2015 |
| CN | 105447908 A | 3/2016 |

(Continued)

OTHER PUBLICATIONS

Su-Jung Park, Richard Leesungbok, Jae-Won Song, Se Hun Chang, Suk-Won Lee, Su-Jin Ahn, "Analysis of Dimensions and Shapes of Maxillary and Mandibular Dental Arch in Korean Young Adults", The Journal of Advanced Prosthodontics, 2017, pp. 321-327, vol. 9, the Korean Academy of Prosthodontics, Korea.

*Primary Examiner* — Wesner Sajous
(74) *Attorney, Agent, or Firm* — Birch, Stewart, Kolasch & Birch, LLP

(57) ABSTRACT

In one aspect, the present application provides a method for verifying a segmentation result of a 3D digital model of jaw, the method comprises: obtaining a reference position segmentation result of a 3D digital model of jaw, where the reference position result is obtained by segmenting the 3D digital model of jaw positioned at a reference position using a first segmentation method; perturbating the 3D digital model of jaw positioned at the reference position multiple times, and segmenting the 3D digital model of jaw positioned at the multiple perturbed positions using the first segmentation method, to obtain corresponding multiple per- (Continued)

turbed position segmentation results; and determining whether the reference position segmentation result is reliable based on similarities between the reference position segmentation result and the multiple perturbed position segmentation results, where segmentation of the 3D digital model of jaw is to segment teeth from each other and from gingiva, and is to classify facets of the 3D digital model of jaw into tooth numbers and gingiva.

7 Claims, 3 Drawing Sheets

(51) Int. Cl.
| | |
|---|---|
| *G06V 10/77* | (2022.01) |
| *G06V 10/82* | (2022.01) |
| *G06V 10/764* | (2022.01) |
| *G06V 20/64* | (2022.01) |
| *G06N 3/04* | (2023.01) |
| *G06N 3/08* | (2023.01) |
| *G06N 5/01* | (2023.01) |
| *A61C 7/00* | (2006.01) |
| *A61C 19/00* | (2006.01) |
| *G06F 18/22* | (2023.01) |
| *G06V 10/74* | (2022.01) |
| *G06V 10/776* | (2022.01) |
| *G06V 10/44* | (2022.01) |

(52) U.S. Cl.
CPC .......... *G06V 10/761* (2022.01); *G06V 10/764* (2022.01); *G06V 10/776* (2022.01); *G06V 10/82* (2022.01); *G06T 2207/10028* (2013.01); *G06T 2207/20081* (2013.01); *G06T 2207/20084* (2013.01); *G06T 2207/30036* (2013.01); *G06V 20/64* (2022.01)

(58) Field of Classification Search
CPC G06T 2207/20084; G06T 2207/30036; G06V 10/454; G06V 10/761; G06V 10/82; G06V 10/776; G06V 10/764; G06V 20/64; G06N 3/04; G06N 3/045; G06N 3/08; G06N 3/086; G06N 5/01; A61C 7/002; A61C 9/0046; A61C 9/0053; A61C 9/002; G06F 18/2414; G06F 18/213; G06F 18/22
USPC ........................................................ 345/423
See application file for complete search history.

(56) References Cited

U.S. PATENT DOCUMENTS

| | | | |
|---|---|---|---|
| 9,283,061 B2* | 3/2016 | Tank .................... | A61C 9/0053 |
| 10,849,585 B1* | 12/2020 | Teixeira ................ | A61B 5/055 |
| 10,943,351 B2* | 3/2021 | Liu ........................ | G06N 3/045 |
| 11,663,852 B2* | 5/2023 | Wucher ................ | G06V 20/46 |
| | | | 382/100 |
| 2019/0026598 A1* | 1/2019 | Salah .................... | G06F 18/213 |
| 2019/0026599 A1* | 1/2019 | Salah .................... | G06F 18/22 |
| 2019/0026889 A1* | 1/2019 | Salah .................... | A61C 7/002 |
| 2019/0026893 A1* | 1/2019 | Salah .................... | G06T 7/62 |
| 2019/0026894 A1* | 1/2019 | Salah .................... | G16H 30/20 |
| 2019/0080029 A1* | 3/2019 | Kuo ...................... | A61C 7/08 |
| 2019/0247165 A1 | 8/2019 | Müllner et al. | |
| 2020/0387739 A1* | 12/2020 | Williams .............. | G06T 5/005 |
| 2021/0082184 A1* | 3/2021 | Claessen .............. | G06T 17/00 |
| 2021/0338379 A1* | 11/2021 | Salah .................... | G06N 3/08 |
| 2021/0358124 A1* | 11/2021 | Salah .................... | A61C 7/002 |
| 2022/0215531 A1* | 7/2022 | Azernikov ............ | G06T 7/11 |
| 2022/0215547 A1* | 7/2022 | Salah .................... | G06T 7/0012 |

FOREIGN PATENT DOCUMENTS

| | | | | |
|---|---|---|---|---|
| CN | 109165663 A | * | 1/2019 | .......... G06K 9/6211 |
| CN | 109165663 A | | 1/2019 | |
| CN | 109903396 A | * | 6/2019 | ............ G06V 10/82 |
| CN | 109903396 A | | 6/2019 | |

* cited by examiner

METHOD FOR VERIFYING A SEGMENTATION RESULT OF A 3D DIGITAL MODEL OF JAW

CROSS REFERENCE TO RELATED APPLICATIONS

The present application is a 35 U.S.C. § 371 National Phase conversion of International (PCT) Patent Application No. PCT/CN2021/073235, filed on Jan. 22, 2021, which is based on and claims priority to Chinese Patent Application No. 202010317368.6, filed on Apr. 21, 2020, the disclosure of which is incorporated by reference herein. The PCT International Patent Application was filed and published in Chinese.

FIELD OF THE APPLICATION

The present application generally relates to a method for verifying a segmentation result of a three dimension (3D) digital model of jaw.

BACKGROUND

Nowadays, dental diagnoses and treatments increasingly rely on computer technologies. In many cases, it is necessary to segment a 3D digital model of jaw including a dentition and at least part of gingiva obtained by scanning, to separate crowns of teeth from the gingiva and the crowns of teeth from each other.

Currently, although semiautomatic and automatic methods for segmenting 3D digital model of jaw have emerged, no reliable method for automatically verifying segmentation result of 3D digital model of jaw is available. Therefore, it is necessary to provide a method for verifying a segmentation result of a 3D digital model of jaw.

SUMMARY

In one aspect, the present application provides a method for verifying a segmentation result of a 3D digital model of jaw, the method comprises: obtaining a reference position segmentation result of a 3D digital model of jaw, where the reference position result is obtained by segmenting the 3D digital model of jaw positioned at a reference position using a first segmentation method; perturbating the 3D digital model of jaw positioned at the reference position multiple times, and segmenting the 3D digital model of jaw positioned at the multiple perturbed positions using the first segmentation method, to obtain corresponding multiple perturbed position segmentation results; and determining whether the reference position segmentation result is reliable based on similarities between the reference position segmentation result and the multiple perturbed position segmentation results, where segmentation of the 3D digital model of jaw is to segment teeth from each other and from gingiva, and is to classify facets of the 3D digital model of jaw into tooth numbers and gingiva.

In some embodiments, the first segmentation method may be based on a deep learning artificial neural network, and the deep learning artificial neural network is trained with a plurality of 3D digital models of jaws positioned at the reference position.

In some embodiments, the deep learning artificial neural network may be a DGCNN network.

In some embodiments, the method for verifying a segmentation result of a 3D digital model of jaw may further comprise: for each class, calculating a similarity between the reference position segmentation result and each of the perturbed position segmentation results; for each class, calculating a reliability of the reference position segmentation result based on corresponding similarities; calculating a representative reliability of the reference position segmentation result based on reliabilities of all classes; and determining whether the reference position segmentation result is reliable based on the representative reliability and a preset threshold.

In some embodiments, for each class, the similarity between the reference position segmentation result and each of the perturbed position segmentation results may be calculated based on number of facets classified as the class in both the reference position segmentation result and the perturbed position segmentation result.

In some embodiments, the representative reliability may be a minimum value in the reliabilities of all classes.

In some embodiments, the method for verifying a segmentation result of a 3D digital model of jaw may further comprise: if the reference position segmentation result is unreliable, determining whether there is a reliable segmentation result in the multiple perturbed position segmentation results by the same method, and if YES, taking the reliable perturbed position segmentation result as a final segmentation result.

BRIEF DESCRIPTION OF THE DRAWINGS

The above and other features of the present application will be further illustrated below with reference to figures and their detailed description. It should be appreciated that these figures only show several exemplary embodiments according to the present application, so they should not be construed as limiting the protection scope of the present application. Unless otherwise specified, the figures are not necessarily drawn to scale, and similar reference numbers therein denote similar components.

DETAILED DESCRIPTION OF ILLUSTRATED EMBODIMENTS

In the following detailed description, reference is made to the accompanying drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

To improve accuracy and efficiency of segmentation of 3D digital model of jaw, and meanwhile to reduce the need for manual intervention, one aspect of the present application provides a novel method for segmenting 3D digital model of jaw.

Figure 1:
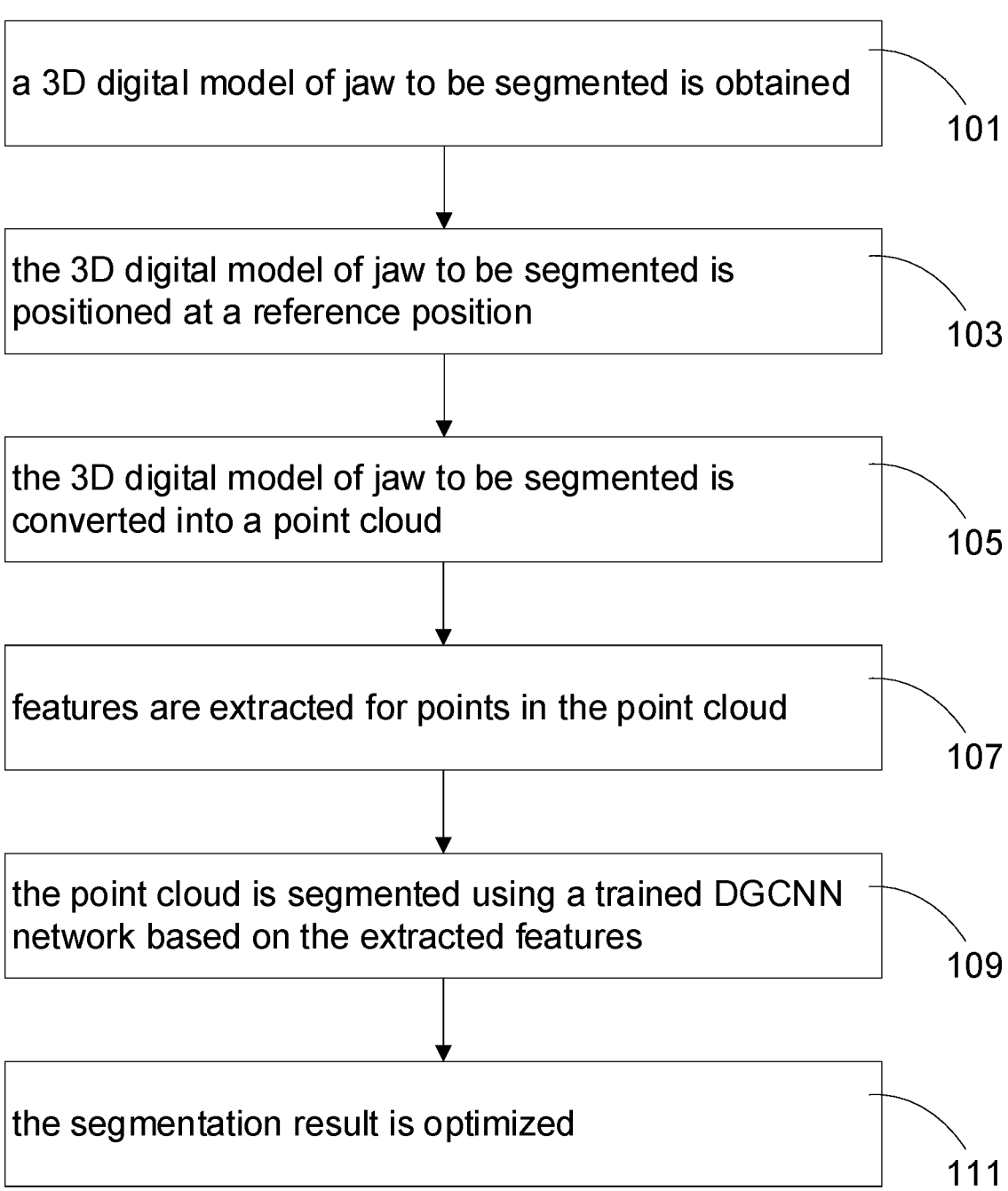
FIG. 1 is a schematic flowchart of a method for segmenting 3D digital model of jaw in one embodiment of the present application.

Referring to FIG. 1, it illustrates a schematic flowchart of a method 100 for segmenting 3D digital model of jaw in one embodiment of the present application.

In 101, a 3D digital model of jaw to be segmented is obtained.

In one embodiment, the 3D digital model of jaw to be segmented may be obtained by scanning a patient's oral cavity (for example, scanning using a laser intra-oral scanner). In another embodiment, the 3D digital model of jaw to be segmented may also be obtained by scanning a physical model of the patient's jaw (for example, a plaster model).

In one embodiment, the 3D digital model of jaw to be segmented is constructed of triangular facets. A high-precision 3D digital model of jaw includes a large number of triangular facets, e.g., over 100,000 triangular facets or even over 150,000 triangular facets.

In 103, the 3D digital model of jaw to be segmented is positioned at a reference position.

To ensure the robustness of a deep learning artificial neural network for segmenting 3D digital model of jaw, 3D digital models of jaws used to train the deep learning artificial neural network and 3D digital models of jaws to be segmented using the same are positioned at a pre-defined reference position, which includes a pre-defined direction and a pre-defined location.

In one embodiment, a plurality of typical reference 3D digital models of upper and lower jaws may be selected according to a priori knowledge, for example, five reference 3D digital models of jaws corresponding to normal dental arch, short dental arch, long dental arch, wide dental arch and narrow dental arch, respectively. Inspired by the present application, it is understood that the selection of the reference 3D digital models of jaws is not limited to the above example. For example, three reference 3D digital models of jaws, namely, an ovoid shape reference 3D digital model of jaw, a V-shape reference 3D digital model of jaw and a U-shape reference 3D digital model of jaw may be selected for upper jaw and lower jaw respectively, according to "Analysis of Dimensions and Shapes of Maxillary and Mandibular Dental Arch in Korean Young Adults" by Su-Jung Park, Richard Leesungbok, Jae-Won Song, Se Hun Chang, Suk-Won Lee and Su-Jin Ahn on The Journal of Advanced Prosthodontics, 9(5): 321-327, 2017.

In one embodiment, the reference 3D digital models of jaws are at the reference position, and the jaw 3D digital model to be segmented may be positioned at the reference position by registering it with the reference 3D digital models of jaws.

In one embodiment, the 3D digital model of jaw to be segmented may be positioned at the reference position by registering it with the reference 3D digital models of jaws using an Iterative Closest Point (ICP) algorithm.

In one embodiment, the 3D digital model of jaw to be segmented may be registered with the five reference jaw 3D digital model, respectively, and the position corresponding to a registration with the highest matching degree may be selected as the position of the 3D digital model of jaw to be segmented. Then, an average centroid of a large number of previously registered 3D digital models of jaws is calculated and taken as a central position. Finally, the centroid of the registered 3D digital model of jaw to be segmented is translated to the central position, and now the 3D digital model of jaw to be segmented is considered to be at the reference position.

In 105, the 3D digital model of jaw to be segmented is converted into a point cloud.

In the above embodiment, since the 3D digital model of jaw to be segmented is already converted into a point cloud in the process of registering it with the reference 3D digital models of jaws using the ICP algorithm, the operation of converting it into a point cloud may not be performed again. However, if the 3D digital model of jaw to be segmented is not converted into a point cloud in the process that it is positioned to the reference position, the operation of converting it into a point cloud needs to be performed then.

In 107, features are extracted for points in the point cloud.

After extensive experiments, the Inventors of the present application discovered that segmentation based on the following features extracted for each point has relatively high accuracy: coordinates of a central point of a facet (each point in the point cloud may be a central point of a corresponding facet) (x, y, z, 3 features total), normal vector of the facet (3 features), and vectors representing rays from the central point of the facet to the three vertices of the facet (9 features), 15 features total.

In 109, the point cloud is segmented based on the extracted features using a trained dynamic graph convolutional neural network.

In one embodiment, the point cloud may be classified (segmented) using a dynamic graph convolutional neural network (hereinafter referred to as DGCNN).

In one embodiment, 33 labels may be created to respectively represent 32 teeth and gingiva for classification (segmentation).

In one embodiment, to improve computing efficiency, the point cloud may be sampled, and only sample points are classified using the trained DGCNN network.

In one embodiment, the sampling may be uniform sampling.

In one embodiment, the number of the sample points may be set according to capability of a computing system, for example, 30,000 sample points.

In one embodiment, to further improve computing efficiency, the sample points may be divided into groups uniformly, and then each group of sample points may be classified using the trained DGCNN network. In one embodiment, the number of groups may be set according to the capability of the computing system, for example, the sample points may be divided into three groups.

The DGCNN network will consider neighboring points when it classifies a point (i.e., feature relationships between the point to be classified and its neighboring points will be calculated, and it will be considered in classification of the point). After extensive experiments, the Inventors of the present application discovered that the accuracy of the classification increases with the number of considered neighboring points, which number is increased at a step size of 5, until the number reaches 25. And after that, even though the number of considered neighboring points further increases, the accuracy of the classification is not improved significantly. Therefore, preferably, the number of the neighboring points to be considered may be selected between a range of 20-30, and more preferably, the number of the neighboring points to be considered may be selected between a range of 25-30.

For each sample point, the DGCNN network outputs its probability distribution on the 33 classes (including 32 teeth and gingiva), and takes a class with a maximum probability as a classification result of the sample point.

After the classification of the sample points is completed, other points in the point cloud need to be classified. In one embodiment, other points in the point cloud may be classified using a K-Nearest Neighbour (KNN) algorithm, based on the classification result of the sample points.

A basic idea of the KNN algorithm is that if the majority of k samples most similar (i.e., most close in a feature space) to a sample (a point to be classified) in the feature space belong to a certain class, the sample also belongs to the class. In the KNN algorithm, the selected neighboring samples are classified samples.

In one embodiment, an average of probability distributions of neighboring points of the point to be classified may be calculated, the average may be taken as the probability distribution of the point to be classified, and a class with a maximum probability may be taken as the classification result of the point to be classified.

In one embodiment, k may be set to 5, i.e., each non-sample point may be classified based on the class of five most close sample points in the feature space.

After extensive experiments, the Inventors of the present application discovered that the value of k has no substantial influence on the accuracy and the computation complexity of the classification of the network, and it is feasible as long as k is within a reasonable range.

Figure 2:
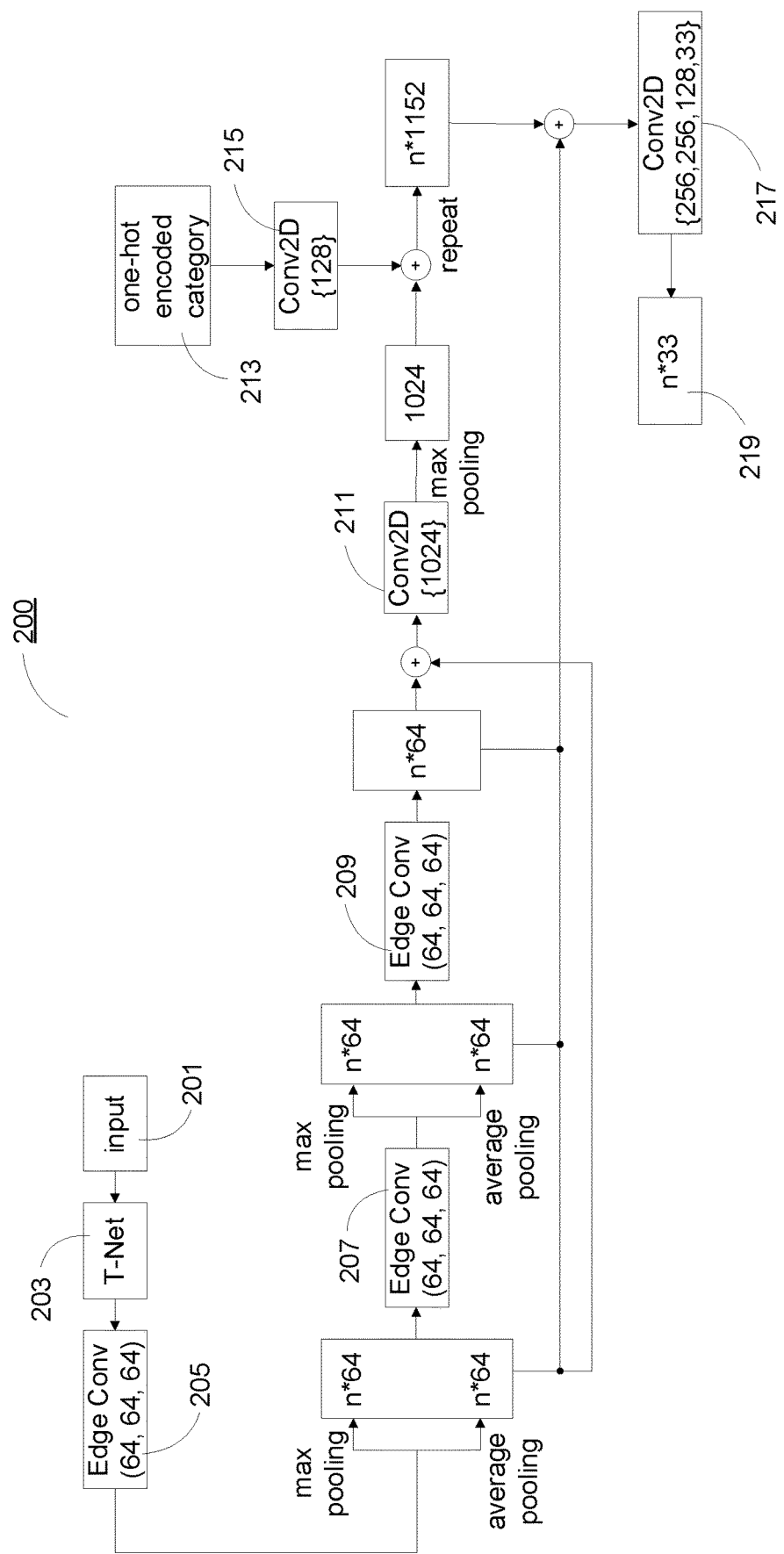
FIG. 2 schematically illustrates a block diagram of a DGCNN network in one embodiment of the present application.

Referring to FIG. 2, it is a schematic block diagram of a DGCNN network 200 in one embodiment of the present application.

An input module 201 is configured to receive extracted features. As for the above embodiment, the input module 201 may receive features extracted from a group of 10,000 sample points, wherein each point has 15 features.

A T-Net subnetwork 203 is configured to implement automatic alignment of point clouds to reduce spatial changes of points. T-Net network is a network for predicting a feature space transformation matrix, it learns based on the input data a transformation matrix whose dimensions are same as that of the feature space, then multiples raw data by the transformation matrix to transform feature space of the input data, so that each subsequent point is related to each point in the input data. Step by step abstraction of the raw point cloud data including features may be achieved through such data fusion.

The DGCNN network 200 in the present embodiment comprises three edge convolution modules 205, 207 and 209, where each edge convolution module has three layers. After extensive experiments, the Inventors of the present application discovered that the three-layer depth setting of the edge convolution modules ensures prediction (classification) accuracy of the network. If the depth of the edge convolution modules is further increased, improvement of prediction accuracy of the network is very limited, and overfitting is more likely to happen and computation complexity will be increased as well.

In the present embodiment, the DGCNN network 200 is able to segment upper and lower jaw 3D digital models as a whole. A one-hot encoded category module 213 is configured to determine which one of the upper jaw and the lower jaw a point belongs to.

In the present embodiment, the DGCNN network 200 further comprises three two-dimensional convolution modules 211, 215 and 217.

The symbol ⊙ in FIG. 2 represents feature concatenation.

An output module 219 is configured to output probability distribution of all points on the 33 classes.

In 111, the segmentation result is optimized.

A smoothing process may be performed to eliminate tiny local unsmooth places (e.g., burrs on boundaries, or class of a facet is different from those of surrounding facets) that might exist in the segmentation result.

In one embodiment, a Graph-Cut algorithm may be used to smooth the segmentation result based on geometric relationships between facets of the 3D digital model of jaw.

In one embodiment, two losses, namely, a classification loss and a geometric loss, may be set up. A weighted sum of the classification loss and the geometric loss is minimized using the Graph-Cut algorithm, to smooth the classification result.

The classification loss may be defined as a loss resulted from changing a predicted tooth number (namely, a classification result) of the current facet into another tooth number by smoothing, where the loss equals to a probability value corresponding to the predicted tooth number in the probability distribution of the current facet output by the automatic segmentation system. That is, the greater the probability value is, the greater the loss resulted from the smoothing is. In the calculation of the classification loss, loss calculation may be performed for all possibilities, in other words, losses resulted from changing the predicted class of the current facet into other 32 classes respectively by smoothing may be calculated.

The geometric loss may be defined as a loss resulted from changing a predicted tooth number of the current facet into a predicted tooth number of one of its neighboring facet by smoothing, where the loss equals to a product of a distance from a central point of the current facet to a central point of the neighboring facet and a dihedral angle between the two facets.

Then, the weighted sum of a classification loss and the geometric loss are minimized using the Graph-Cut algorithm, to smooth the classification result.

In one embodiment, in the minimization of the loss, a non-negative constant λ may be set as a weight of the geometric loss to balance the influences of the classification loss and geometric loss on the total loss. Since the boundary between teeth and gingiva is less clear, it is preferred to trust the segmentation result here. Therefore, the weight of the geometric loss between gingiva and teeth may be smaller than that of the geometric loss in other cases. That is to say, when the class of one of the current point and a neighboring point is a tooth, and the class of the other is gingiva, when the class of the current point is changed into the class of the neighboring point by smoothing, the weight of its geometric loss is smaller than those in other cases. After extensive experiments, the Inventors of the present application discovered that when the weight λ of the geometric loss between gingiva and teeth is set to 50, and the weight λ of the geometric loss between teeth is set to 250, the result is satisfactory.

In one embodiment, the minimized loss may be represented by the following Expression (1):

$$\min_{\{l_i,\, i \in F\}} \sum_{i \in F} \xi_U(p_i, l_i) + \lambda \sum_{i,j \in F} \xi_S(p_i, p_j, l_i, l_j) \quad \text{Expression (1)}$$

where the first item stands for the classification loss, the second item stands for the geometric loss, F stands for a set of facets of the 3D digital model of jaw, i stands for the $i^{th}$ facet, $l_i$, stands for the class of the $i^{th}$ facet, whose corresponding probability is $p_i$, wherein, $$\xi_U(p_i, l_i) = -\log(p_i(l_i)) \quad \text{Expression (2)}$$

$$\xi_S(p_i, p_j, l_i, l_j) = \begin{cases} 0 & \text{if } l_i = l_j \\ -\log\dfrac{\theta_{ij}}{\pi}\phi_{ij} & \text{else} \end{cases} \quad \text{Expression (3)}$$

where $\theta_{ij}$ stands for a dihedral angle between facet i and facet j, and $\phi_{ij}$ stands for a distance between the center point of facet i and the center point of facet j.

Inspired by the present application, it is understood that although in the above embodiment, upper jaw and lower jaw 3D digital models are processed in segmentation as a whole, the method of the present application can also be used to segment upper and lower jaw 3D digital models separately (accordingly, the number of classes may be changed into 17, which classes correspond to 16 teeth and gingiva, respectively).

Although the method for segmenting 3D digital model of jaw of the present application has extremely high accuracy, it is still impossible to ensure 100% segmentation accuracy in some extreme cases. Therefore, it is desirable to provide a method for determining reliability of a classification result.

Currently, there is no method for determining reliability of a segmentation result of a 3D digital model of jaw generated by an artificial neural network. After extensive experiments, the Inventors of the present application developed a method for evaluating reliability of a segmentation result based on perturbation. A basic idea of the method is determining whether the segmentation method is sensitive to position perturbation of the current 3D digital model jaw, if yes, then it is believed that the current segmentation result is unreliable.

Figure 3:
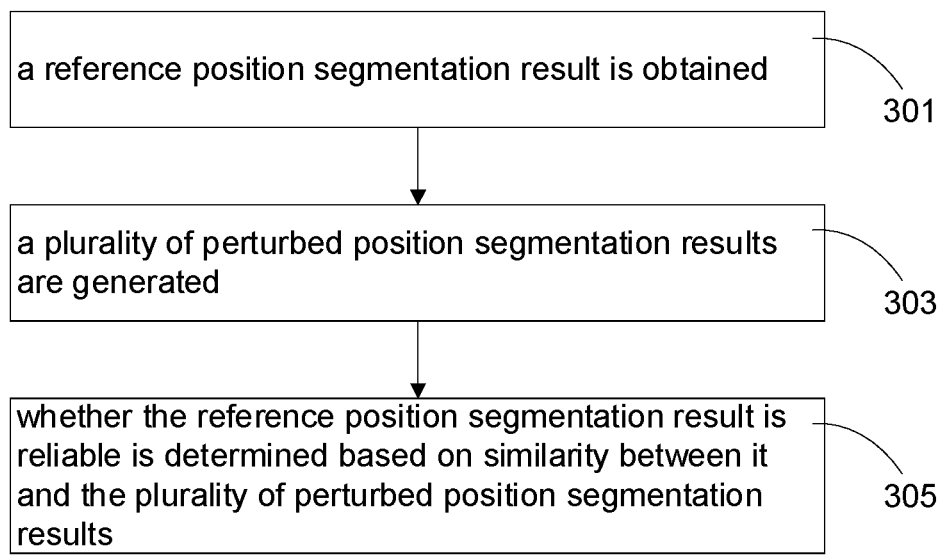
FIG. 3 is a schematic flowchart of a method for verifying a segmentation result of a 3D digital model of jaw in one embodiment of the present application.

Referring to FIG. 3, it schematically illustrates a flow chart of a method 300 for determining reliability of a segmentation result of a 3D digital model of jaw generated by an artificial neural network in one embodiment of the present application.

According to the above, in the method for segmenting 3D digital model of jaw of the present application, before a 3D digital model of jaw is segmented using the DGCNN network, the 3D digital model of jaw needs to be positioned at a reference position. Since the network is trained using 3D digital models of jaws positioned at the reference position, the segmentation accuracy is thereby ensured.

In 301, a reference position segmentation result is obtained.

In one embodiment, the reference position segmentation result may be a result of segmenting a 3D digital model of jaw positioned at the reference position using the segmentation method of the present application.

In 303, a plurality of perturbed position segmentation results are generated.

In one embodiment, the 3D digital model of jaw positioned at the reference position may be rotated about x-axis, y-axis and z-axis by positive and negative 5 degrees and positive and negative 10 degrees, respectively, to obtain 12 perturbations.

Then, the same method is used to segment the 3D digital model of jaw at the 12 perturbed positions, to obtain corresponding 12 perturbed position segmentation results.

Inspired by the present application, it is understood that perturbation type and number of perturbed positions may be determined according to specific situations and are not limited to the above specific examples. For example, perturbation types may include translation, rotation and a combination thereof, or may be perturbation along any axis or in any direction.

In 305, whether the reference position segmentation result is reliable is determined based on similarity between the reference position segmentation result and the plurality of perturbed position segmentation results.

In one embodiment, for each tooth number X, given the number of facets classified as the tooth number X in the reference position segmentation result is A, the number of facets classified as the tooth number X in a first perturbed position segmentation result is B, and the number of facets classified as the tooth number X in both the reference position division result and the first perturbation position division result is C (C<=A, C<=B). The smaller among C/A and C/B may be taken as the similarity between the predictions (annotations) of the tooth number X at the reference position and the first perturbed position. If denominator of C/A or C/B equals 0, the fraction may be given a value of 1.

As for each tooth number X, the above operation is repeated 12 times (corresponding to the number of perturbed position segmentation results), 12 similarities will be obtained accordingly. For each tooth number X, the first quartile (Q1) of the 12 similarities is taken as the reliability of the segmentation of the tooth number X by the segmentation method. A minimum value among the reliabilities of the segmentation of all tooth numbers is taken as the representative reliability of the segmentation result of the whole 3D digital model jaw positioned at the reference position by the segmentation method.

In one embodiment, a threshold may be set. If the representative reliability of the segmentation result is greater than the threshold, the segmentation result will be considered to be reliable, otherwise the segmentation result will be considered to be unreliable.

In one embodiment, the threshold may be set to 0.85 based on the current parameter setting.

Inspired by the present application, it is understood that for the reliability of the segmentation of each tooth number, other values may also be used to replace the first quartile of the 12 similarities, for example, the second quartile or an average value. Accordingly, the threshold might need to be adjusted.

Although the method for segmenting 3D digital model of jaw in the embodiment of the present application is based on segmentation of points, inspired by the present application, it is understood that the method for verifying segmentation result of the present application is also applicable to segmentation method based on facets.

Inspired by the present application, in addition to the segmentation method of the present application, the method for verifying segmentation result of the present application is also applicable to any segmentation method which is based on a neural network which is trained using 3D digital models of jaws positioned at a reference position and segments 3D digital models of jaws positioned at the reference position.

When a segmentation result is determined unreliable, there may be two options: one is reminding the user to manually check and/or adjust; the other is trying to select a reliable result from the plurality of perturbed position segmentation results as a final segmentation result to be output, if no reliable segmentation result can be found in the plurality of perturbed position segmentation results, the user will be notified to manually check and/or adjust.

In one embodiment, the 12 perturbed position segmentation results may be traversed to identify a perturbed position segmentation result having the highest reliability, and take it as the final segmentation result to be output. In this case, even if the segmentation result needs to be adjusted manually, the workload of the manual adjustment may be reduced.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

I claim:

1. A computer-implemented method for verifying a segmentation result of a 3D digital model of jaw, comprising:
    segmenting a 3D digital model of jaw positioned at a reference position using a trained deep learning artificial neural network to obtain a reference position segmentation result;
    perturbating the 3D digital model of jaw positioned at the reference position by translating and/or rotating the 3D digital model of jaw at the reference position multiple times to obtain the 3D digital model of jaw positioned at multiple perturbed positions, and segmenting the 3D digital model of jaw positioned at the multiple perturbed positions using the trained deep learning artificial neural network, to obtain corresponding multiple perturbed position segmentation results;
    comparing the reference position segmentation result and the multiple perturbed position segmentation results to obtain similarities; and
    determining whether the reference position segmentation result is reliable based on the similarities between the reference position segmentation result and the multiple perturbed position segmentation results,
    wherein segmentation of the 3D digital model of jaw is to segment teeth from each other and from gingiva, and is to classify facets of the 3D digital model of jaw into tooth numbers and gingiva.

2. The method for verifying a segmentation result of a 3D digital model of jaw according to claim 1, wherein the deep learning artificial neural network is trained with a plurality of 3D digital models of jaws positioned at the reference position.

3. The method for verifying a segmentation result of a 3D digital model of jaw according to claim 2, wherein the deep learning artificial neural network is a dynamic graph convolutional neural network.

4. The method for verifying a segmentation result of a 3D digital model of jaw according to claim 1 further comprising:
    for each class, calculating a similarity between the reference position segmentation result and each of the perturbed position segmentation results;
    for each class, calculating a reliability of the reference position segmentation result based on corresponding similarities;
    calculating a representative reliability of the reference position segmentation result based on reliabilities of all classes; and
    determining whether the reference position segmentation result is reliable based on the representative reliability and a preset threshold.

5. The method for verifying a segmentation result of a 3D digital model of jaw according to claim 4, wherein for each class, the similarity between the reference position segmentation result and each of the perturbed position segmentation results is calculated based on number of facets classified as the class in both the reference position segmentation result and the perturbed position segmentation result.

6. The method for verifying a segmentation result of a 3D digital model of jaw according to claim 4, wherein the representative reliability is a minimum value in the reliabilities of all classes.

7. The method for verifying a segmentation result of a 3D digital model of jaw according to claim 1 further comprising: if the reference position segmentation result is unreliable, determining whether there is a reliable segmentation result in the multiple perturbed position segmentation results by the same method, and if YES, taking the reliable perturbed position segmentation result as a final segmentation result.

* * * * *